US012058644B2

United States Patent
Xu et al.

(10) Patent No.: US 12,058,644 B2
(45) Date of Patent: Aug. 6, 2024

(54) CROSS-SLOT PAGING CONFIGURATION AND TRANSMISSION

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Murtaza A. Shikari, Mountain View, CA (US); Sarma V. Vangala, Campbell, CA (US); Sethuraman Gurumoorthy, San Ramon, CA (US); Srirang A Lovlekar, Fremont, CA (US); Wei Zeng, Saratoga, CA (US); Yuchul Kim, San Jose, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 354 days.

(21) Appl. No.: 17/593,651

(22) PCT Filed: Jul. 21, 2020

(86) PCT No.: PCT/CN2020/103218
§ 371 (c)(1),
(2) Date: Sep. 22, 2021

(87) PCT Pub. No.: WO2022/016360
PCT Pub. Date: Jan. 27, 2022

(65) Prior Publication Data
US 2022/0312367 A1    Sep. 29, 2022

(51) Int. Cl.
*H04W 68/00*    (2009.01)
*H04L 5/00*    (2006.01)
(Continued)

(52) U.S. Cl.
CPC ......... *H04W 68/005* (2013.01); *H04L 5/0053* (2013.01); *H04W 68/02* (2013.01); *H04W 72/0446* (2013.01); *H04W 72/23* (2023.01)

(58) Field of Classification Search
CPC ............... H04W 68/005; H04W 68/02; H04W 72/23; H04W 72/0446; H04L 5/0053
(Continued)

(56) References Cited

U.S. PATENT DOCUMENTS

2019/0104498 A1    4/2019  Jung et al.
2020/0169446 A1*   5/2020  Chen ..................... H04L 5/0053
(Continued)

FOREIGN PATENT DOCUMENTS

CN    110366251    10/2019
CN    110881210    3/2020
(Continued)

OTHER PUBLICATIONS

CATT, "Necessity of Adding an Offset when Calculating PF"; 3GPP TSG-RAN WG2 Meeting #103; R2-1811249; Aug. 24, 2018; 4 sheets.
Huawei et al., "Offline summary for AI 7.1.1.3 on Paging"; 3GPP TSG RAN WG1 Meeting #92bis; R1-1805508; Apr. 20, 2018; 7 sheets.

*Primary Examiner* — Ted M Wang
(74) *Attorney, Agent, or Firm* — Fay Kaplun & Marcin, LLP

(57) ABSTRACT

A network configures and transmits paging information. The network transmits configuration information to a user equipment (UE) operating in the network, wherein the configuration information comprises a value N based on a minimum gap between reception of a paging downlink control information (DCI) by the UE and fully processing the paging DCI by the UE, configures a paging DCI to be transmitted to the UE on a Physical Downlink Control Channel (PDCCH), wherein the paging DCI includes scheduling information for
(Continued)

a Physical Downlink Shared Channel (PDSCH) and transmits the paging DCI to the UE on the PDCCH.

20 Claims, 7 Drawing Sheets

(51) Int. Cl.
 *H04W 68/02* (2009.01)
 *H04W 72/0446* (2023.01)
 *H04W 72/23* (2023.01)

(58) Field of Classification Search
 USPC .......................................................... 455/458
 See application file for complete search history.

(56) References Cited

U.S. PATENT DOCUMENTS

| | | |
|---|---|---|
| 2021/0105739 A1* | 4/2021 | Lin ........................ H04L 5/0098 |
| 2022/0086761 A1 | 3/2022 | Maleki et al. |
| 2022/0279479 A1 | 9/2022 | Nader et al. |
| 2022/0369298 A1 | 11/2022 | Lin et al. |

FOREIGN PATENT DOCUMENTS

| | | |
|---|---|---|
| CN | 111096009 | 5/2020 |
| JP | 2020/162018 | 10/2020 |
| WO | 2018/233587 | 12/2018 |
| WO | 2020/068253 | 4/2020 |

* cited by examiner

| DCI Content | UE Operation to receive the scheduled paging message |
|---|---|
| Non-3GPP access | For UE not supporting non-3GPP access, it is not required to receive the scheduled PDSCH |
| Voice | For UE disabling voice or not intending to perform voice service, it is not required to receive the scheduled PDSCH |
| Others | For UE only performing voice service, it is not required to receive the scheduled PDSCH |
| RAN initiated paging | For IDLE UE, it is not required to receive the scheduled PDSCH |
| CN initiated paging | For INACTIVE UE, it is not required to receive the scheduled PDSCH |
| Slicing Info | The UE that is interested in the slicing ID (List)/ NSSAI-List is required to receive the scheduled PDSCH |
| Partial UE ID (N LSB) | The UE that the N LSB of its UE ID is same as the partial UE ID is required to receive the scheduled PDSCH |
| WUS Group ID (configured) | The UE configured with the WUS group ID is required to receive the scheduled PDSCH |
| WUS Group ID (rule based) | The UE that the UE-ID % N is same as the ID is required to receive the scheduled PDSCH |

Fig. 7

CROSS-SLOT PAGING CONFIGURATION AND TRANSMISSION

BACKGROUND

In 5G new radio (NR) wireless communications, a user equipment (UE) may enter a radio resource control (RRC) Idle mode or an RRC Inactive mode at various times to optimize power consumption at the UE. When the UE is in the RRC Idle mode, the UE does not exchange any data with the 5G NR network. The UE switches to an RRC connected mode by establishing a connection with a next generation NodeB (gNB) of the 5G NR network to exchange data with the network. If there is no activity at the UE for a period of time, the UE can suspend its RRC session by moving to the RRC Inactive mode, during which a minimal amount of data is exchanged with the 5G NR network.

One type of information that a UE may receive while in an RRC Idle or Inactive mode is paging transmissions. Paging transmissions may notify the UE that the network has data or messages (e.g., short messages) for the UE (e.g., voice call, system information changes, earthquake, and tsunami warning system (ETWS), commercial mobile alert service (CMAS) indications, etc.). Paging messages may be sent to the UE over a paging control channel (PCCH) (e.g., Physical Downlink Shared Channel (PDSCH)) and short messages may be sent to the UE over a physical downlink control channel (PDCCH). To receive a paging message, the UE may monitor one or more paging occasion (PO) on the PDCCH for each paging discontinuous reception (DRX) cycle.

In multiple beam operation, the POs are a set of PDCCH monitoring occasions and may include multiple time slots where the paging downlink control information (DCI) may be sent. The length of one PO may be one period of beam sweeping and the UE may assume that the same paging message is repeated in all beams of the sweeping pattern.

As described above, short messages are transmitted on the PDCCH using a paging radio network temporary identifier (P-RNTI) for the UE. The short messages may include an associated paging message using a Short Message field in the DCI format 1_0 or may not include an associated paging message. Paging messages transmitted via the PCCH (e.g., PDSCH) may be used to notify up to 32 UEs.

SUMMARY

Some exemplary embodiments are related to a method performed by a component of a network. The method includes transmitting configuration information to a user equipment (UE) operating in the network, wherein the configuration information comprises a value N based on a minimum gap between reception of a paging downlink control information (DCI) by the UE and fully processing the paging DCI by the UE, configuring a paging DCI to be transmitted to the UE on a Physical Downlink Control Channel (PDCCH), wherein the paging DCI includes scheduling information for a Physical Downlink Shared Channel (PDSCH) and transmitting the paging DCI to the UE on the PDCCH.

Other exemplary embodiments are related to a network component of a network having a transceiver and a processor. The processor is configured to configure configuration information for a user equipment (UE) operating in the network, wherein the configuration information comprises a value N based on a minimum gap between reception of a paging downlink control information (DCI) by the UE and fully processing the paging DCI by the UE, and configure a paging DCI to be transmitted to the UE on a Physical Downlink Control Channel (PDCCH), wherein the paging DCI includes scheduling information for a Physical Downlink Shared Channel (PDSCH). The transceiver is configured to transmit configuration information and the paging DCI to the UE.

Still other exemplary embodiments are related to an integrated circuit. The integrated circuit includes circuitry configured to transmit configuration information to a user equipment (UE) operating in the network, wherein the configuration information comprises a value N based on a minimum gap between reception of a paging downlink control information (DCI) by the UE and fully processing the paging DCI by the UE, circuitry configured to configure a paging DCI to be transmitted to the UE on a Physical Downlink Control Channel (PDCCH), wherein the paging DCI includes scheduling information for a Physical Downlink Shared Channel (PDSCH) and circuitry configured to transmit the paging DCI to the UE on the PDCCH.

BRIEF DESCRIPTION OF THE DRAWINGS

FIG. 7 shows a table that includes exemplary filter information to be used by the UE according to various exemplary embodiments.

DETAILED DESCRIPTION

Figure 1:
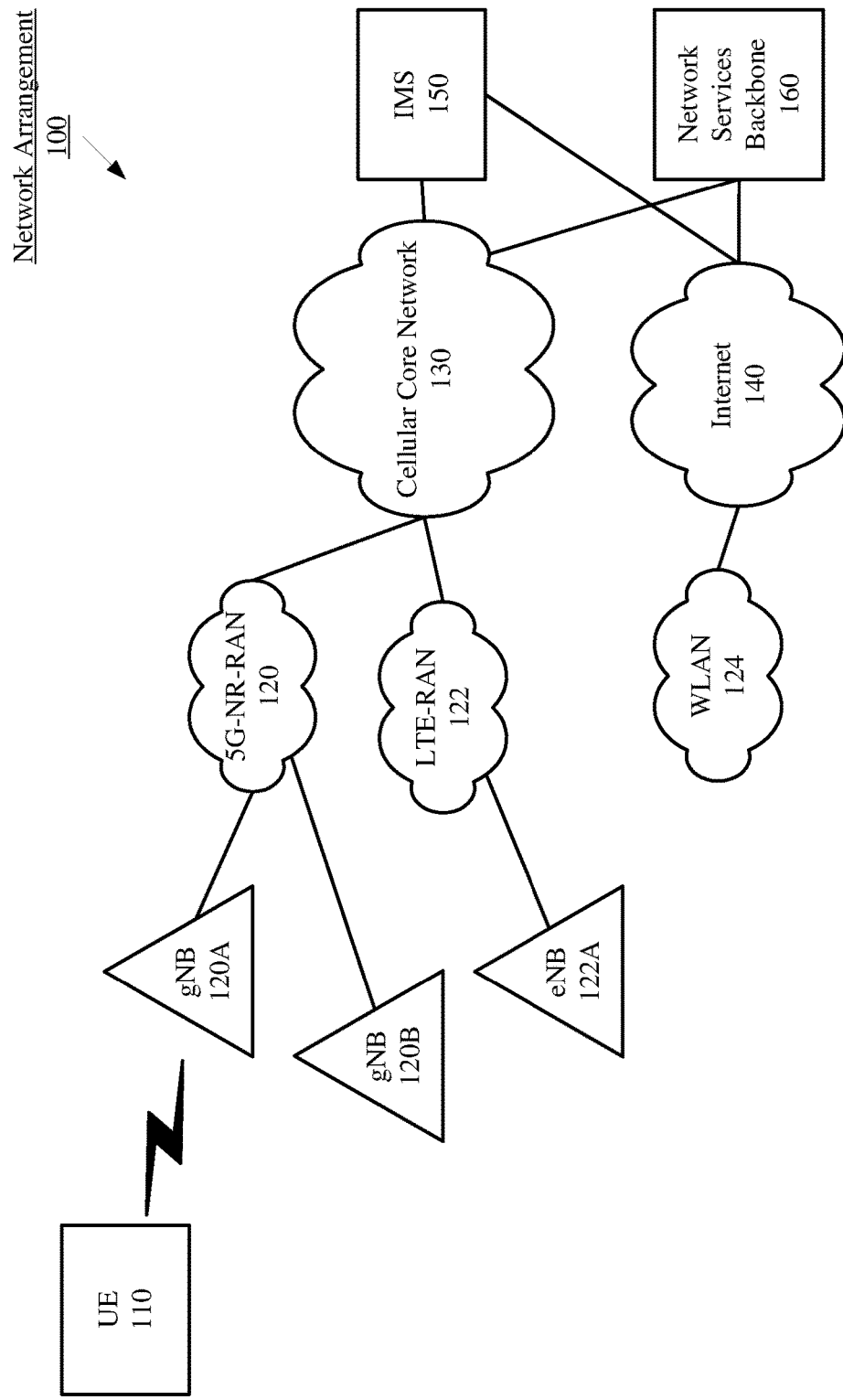
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe cross-slot paging mechanisms that allow a user equipment (UE) to skip certain PDSCH monitoring relating to paging, thereby saving power and processing resources for the UE.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio NR radio access technology (RAT). However, in some embodiments, the network may also include other cellular access networks (e.g., a Long-Term Evolution (LTE) RAT, a legacy RAT, etc.) and/or non-cellular access networks (e.g., 802.XX networks, WiFi, etc.), even though the following description will focus primarily on a 5G NR RAT.

According to exemplary embodiments, a paging schedule is determined by the network based on a minimum gap between reception of a paging DCI and a corresponding PDSCH that includes paging information. This gap allows the UE to process the paging DCI to determine if the PDSCH includes paging information that may be relevant to the UE. When the paging DCI does not include information indicating that the PDSCH includes relevant paging information for the UE, the UE may skip monitoring and decoding the PDSCH.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
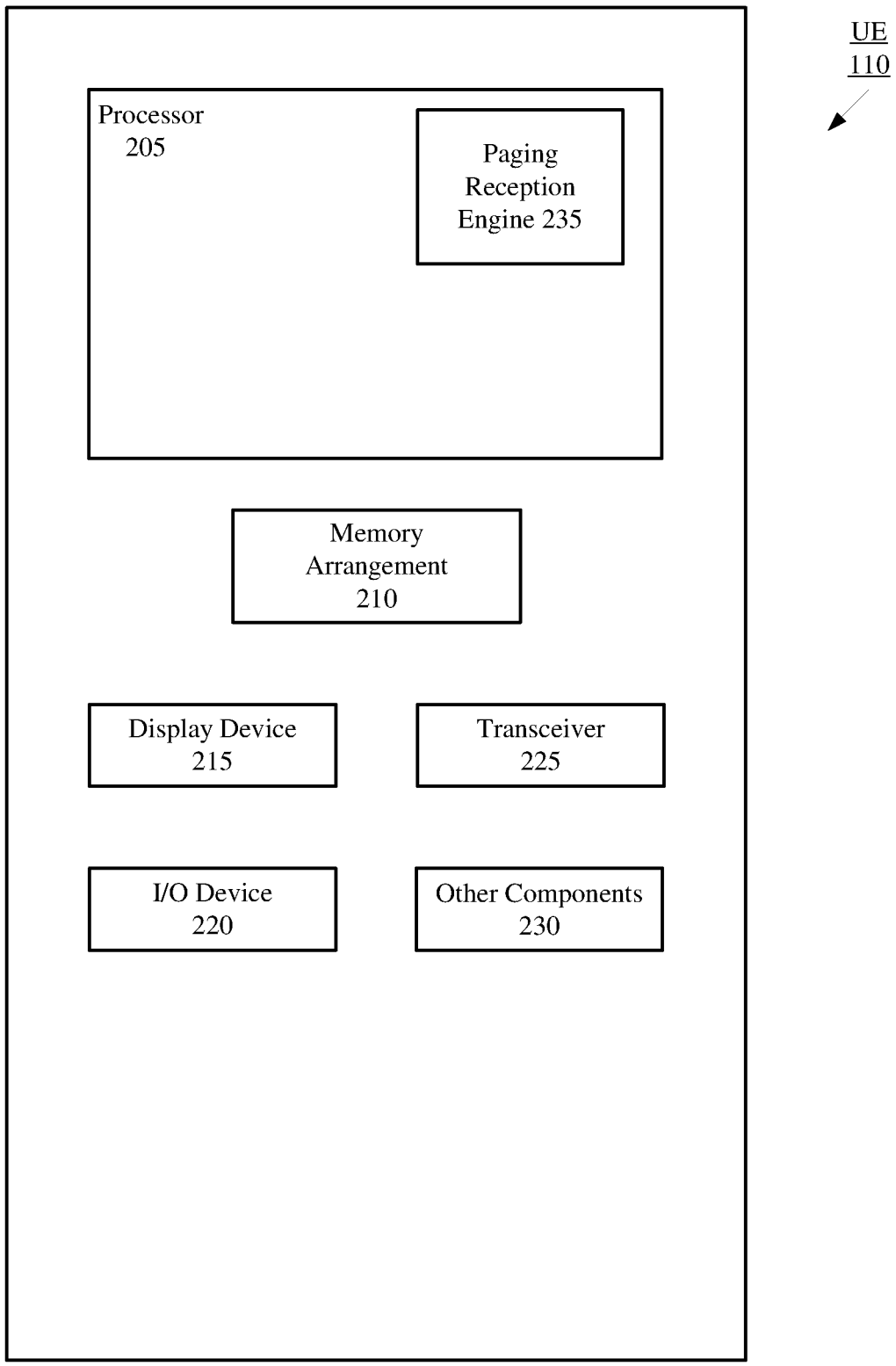
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a paging reception engine 235. The paging reception engine 235 may perform various operations related to paging reception such as, for example, searching a search space for a paging message, processing a paging message, etc.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
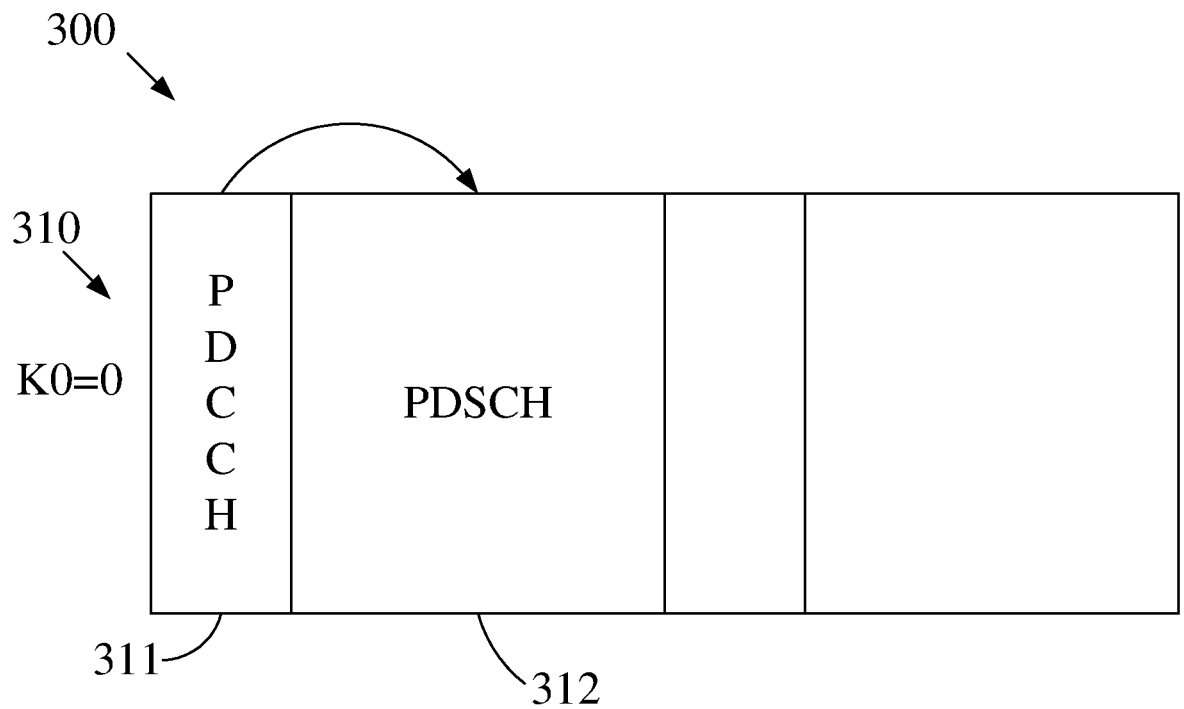
FIG. 3 shows an exemplary paging scheduling scheme.
Figure 3:
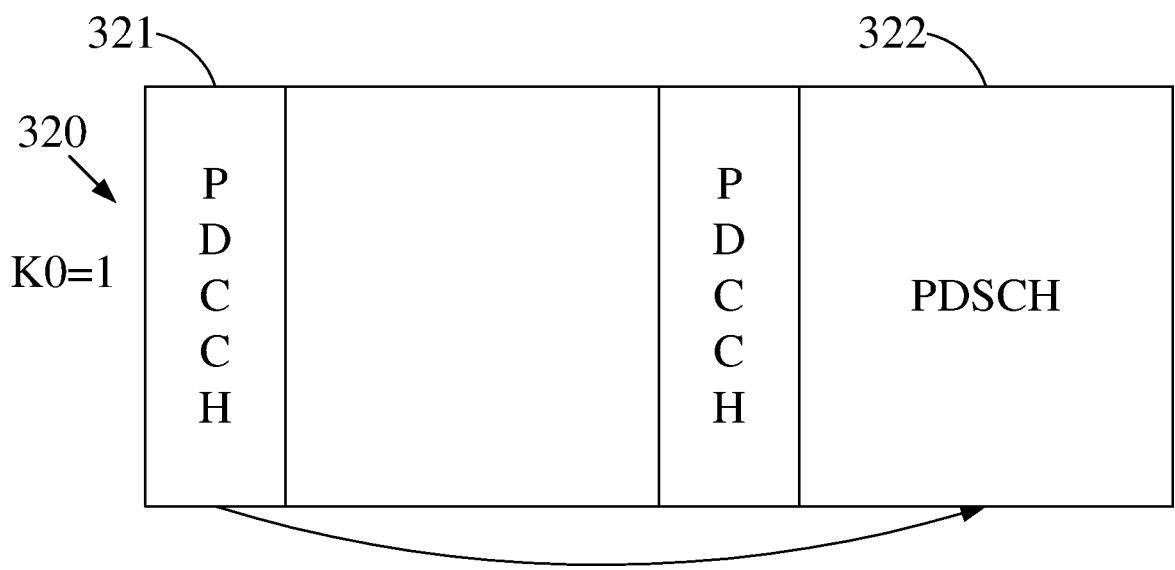

FIG. 3 shows an exemplary paging scheduling scheme 300. The paging scheduling scheme 300 shows two different timings for the paging scheduling 310 and 320 depending on a value of K0 that will be described in greater detail below. The paging scheduling scheme 300 may follow a legacy downlink PDSCH scheduling method. In this example, the PDCCH 311 or 321 may include a radio resource control (RRC) configuration that includes a search space for a paging message within the PDCCH and a control resource set (CORESET) which include the set of physical resources carrying the DCI. The PDCCH DCI Format 1_0 includes the short messages and may also include the scheduling information for the PDSCH.

K0 is the minimum scheduling offset between the PDCCH and the PDSCH. Thus, paging schedule 310 shows a schedule where K0=0. This means that the PDSCH 312 that may include the paging message may be included in the same slot. In contrast, paging schedule 320 shows a schedule where K0=1. This means the PDSCH 322 that may include the paging message is not in the same slot as the PDCCH that carries the scheduling information.

To provide an exemplary operation, when the UE 110 is monitoring a paging occasion (PO) having a PDCCH that has a scheduling offset of K0=0, the UE 110 is required to receive and demodulate the PDCCH, blindly decode the PDCCH, receive and demodulate the PDSCH, decode the PDSCH and process the paging message in the PDSCH. However, in many instances, the paging DCI does not include the scheduling information. Thus, the UE 110 is performing the operations related to the PDSCH for no reason. This wastes the power and processing capabilities of the UE 110. The exemplary embodiments resolve this issue by allowing the UE 110 to skip the PDSCH operations when there is no PDSCH scheduled by the paging DCI.

In the exemplary embodiments, the network may configure a cross-slot paging schedule with K0>=N. N may be considered the minimum gap between the DCI reception over-the-air (OTA) and preparation to receive the scheduled PDSCH. As described above, the UE 110 may include a transceiver 225 to receive the OTA transmissions and a processor 205 (e.g., baseband processor) to process the received transmissions. However, there is a time from the receipt of a transmission to the transmission being processed, e.g., demodulate the PDCCH and blindly decode the PDCCH. Only after this time when the DCI of the PDCCH is processed will the UE 110 understand whether the DCI includes scheduling information for a PDSCH. The value of N may be set such that the PDSCH that includes the paging message corresponding to the DCI scheduling information is received after the DCI has been fully processed. In some exemplary embodiments, the value of N may be, for example, a predefined value that is set in the 5G standards (e.g., 3GPP standards).

Figure 4:
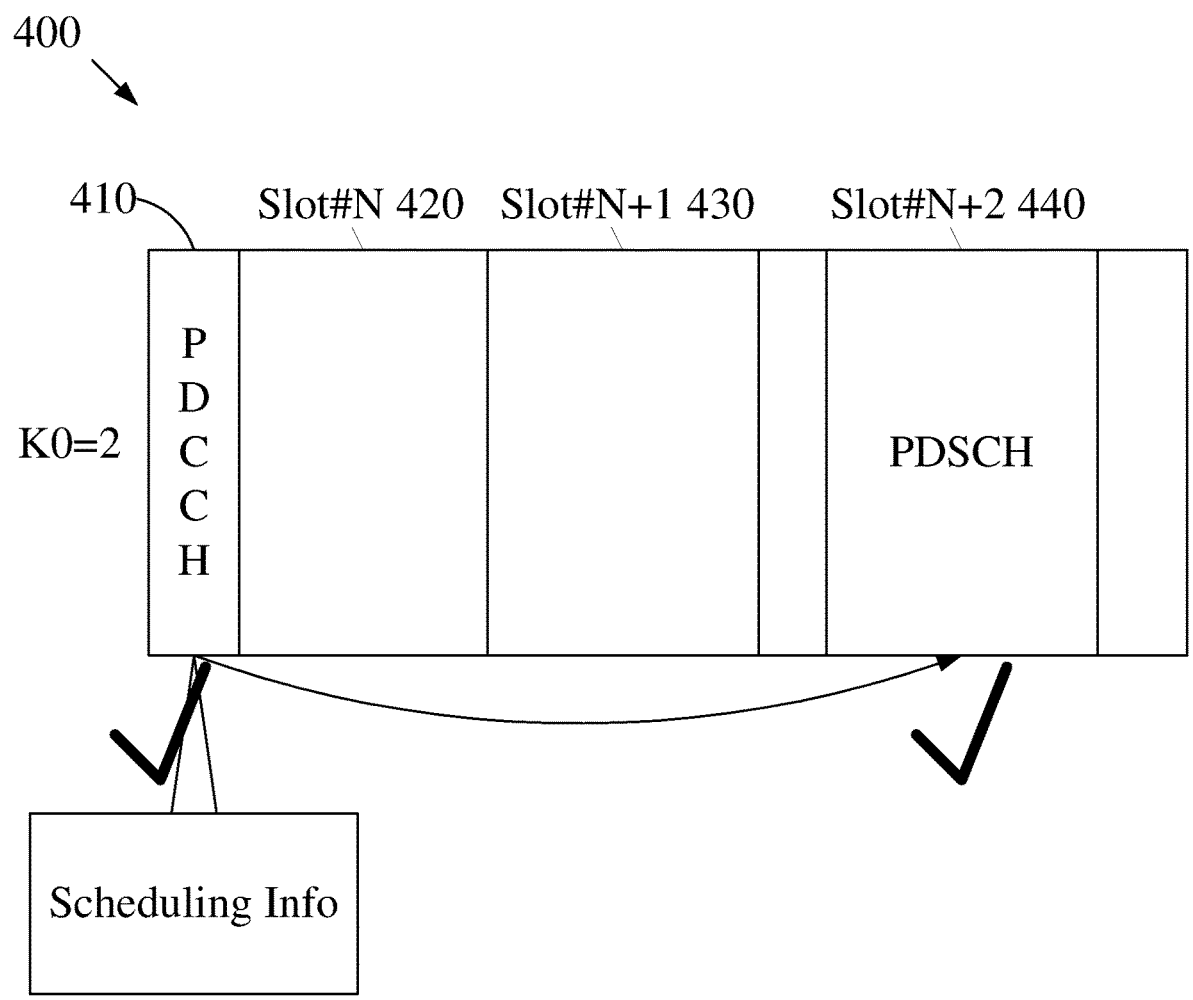
FIG. 4 shows a first exemplary paging scheduling scheme according to various exemplary embodiments.
Figure 5:
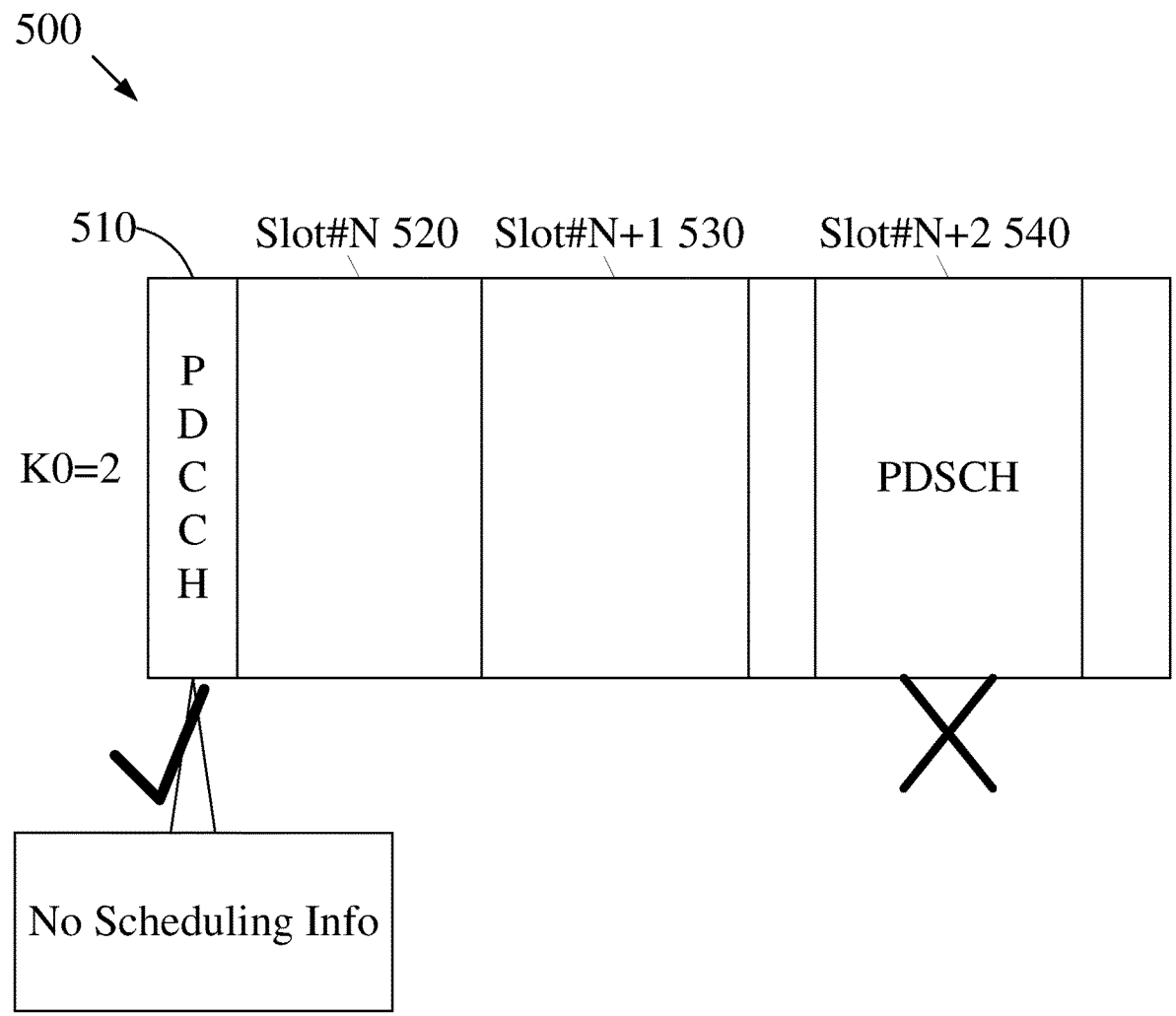
FIG. 5 shows a second exemplary paging scheduling scheme according to various exemplary embodiments.
Figure 6:
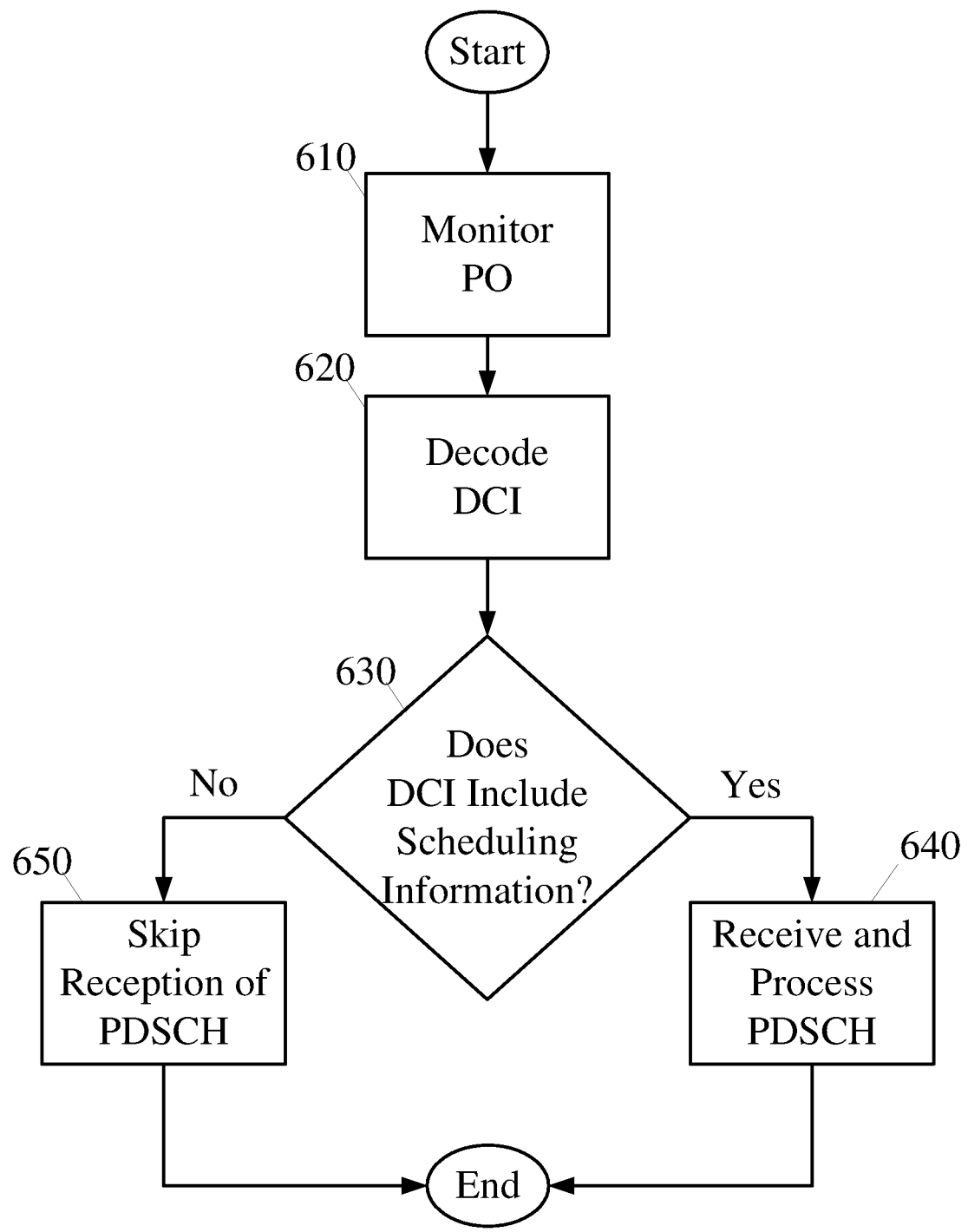
FIG. 6 shows an exemplary method for a UE to monitor paging occasions according to various exemplary embodiments.

FIG. 4 shows a first exemplary paging scheduling scheme 400 according to various exemplary embodiments. FIG. 5 shows a second exemplary paging scheduling scheme 500 according to various exemplary embodiments. FIG. 6 shows an exemplary method for the UE to monitor paging occasions according to various exemplary embodiments. The paging scheduling schemes 400 and 500 with be described with reference to the method 600 of FIG. 6.

In this example, the network (e.g., 5G RAN 120) has configured K0=2 (e.g., N=2). Thus, in this example, in 610, the UE 110 monitors for the DCI in the PDCCH 410, 510 of a current PO. In 620, the UE 110 decodes the DCI in the PDCCH 410, 510. As described above, since K0=2, the UE 110 will understand that the PDSCH of slot N 420, 520 and slot N+1 430, 530 will not include the paging message corresponding to the DCI scheduling information if the DCI includes scheduling information.

However, by the time of receipt of slot N+2 440, 540, the processor 205 of the UE 110 will have completed decoding and processing of the DCI and, in 630, will determine whether the DCI includes scheduling information. In the example of scheduling scheme 400 it may be considered that the DCI includes scheduling information. Thus, in 640, the UE 110 will receive and process the PDSCH in slot N+2 440 according to the scheduling information in the DCI. As described above, this processing may include receiving and demodulating the PDSCH, decoding the PDSCH and processing the paging message in the PDSCH. However, because the UE 110 has received and decoded the DCI including the scheduling information, the UE 110 understands that a relevant paging message is likely included in the PDSCH and thus, the UE 110 is not wasting power or processing resources performing these operations.

In the example of scheduling scheme 500 it may be considered that the DCI does not include scheduling information. Thus, in 650, the UE 110 will skip receiving the PDSCH in slot N+2 540 because the UE 110 is aware that there is no paging message for the UE 110 in the PDSCH based on the DCI not including corresponding scheduling information. Thus, the UE 110 may skip performing the operations associated with the PDSCH, e.g., receiving and demodulating the PDSCH, decoding the PDSCH and processing the paging message in the PDSCH. This scheme allows the UE 110 to save the power and processing resources associated with these operations when the UE 110 understands that there is no paging message for the UE 110 in the PDSCH.

In some embodiments, the network may include additional information in the short message when the DCI includes scheduling information. This additional information may be referred to as filter information. The UE 110 may then use this filter information to further determine whether the UE 110 desires to receive the PDSCH according to the scheduling information. Examples of the filter information will be provided below.

FIG. 7 shows a table 700 that includes exemplary filter information to be used by the UE according to various exemplary embodiments. In a first example, the filter information may include an indication 710 of whether the DCI content is for non-3GPP access. When the UE 110 receives this indication 710, a UE 110 that does not support non-3GPP access may skip receiving the scheduled PDSCH because the paging information is related to non-3GPP access that is not supported by the UE 110.

In a second example, the filter information may include an indication 720 of whether the DCI content is for voice data. When the UE 110 receives this indication 720, a UE 110 that has voice service disabled or does not support voice services may skip receiving the scheduled PDSCH because the paging information is related to unsupported voice services.

In a third example, the filter information may include an indication 730 of whether the DCI content is for other data. When the UE 110 receives this indication 730, a UE 110 that performs only voice service may skip receiving the scheduled PDSCH because the paging information is related to unsupported non-voice services.

In a fourth example, the filter information may include an indication 740 of whether the DCI content is for RAN (e.g., 5G NR RAN 120) initiated paging. When the UE 110 receives this indication 740, a UE 110 that is in the RRC Idle state may skip receiving the scheduled PDSCH because the paging trigger for a UE in the Idle state is only performed by the core network (CN). Thus, the UE 110, when in an RRC Idle state, will understand that a RAN initiated page is not intended for the UE 110.

In a fifth example, the filter information may include an indication 750 of whether the DCI content is for CN initiated paging. When the UE 110 receives this indication 750, a UE 110 that is in the RRC Inactive state may skip receiving the scheduled PDSCH because the paging trigger for a UE in the Inactive state is only performed by the RAN. Thus, the UE 110, when in an RRC Inactive state, will understand that a CN initiated page is not intended for the UE 110.

In a sixth example, the filter information may include an indication 760 of whether the DCI content includes slicing information. When the UE 110 receives this indication 760, the UE 110 may determine whether the UE 110 is interested in slicing information. If the UE 110 includes the Network Slice Selection Assistance Information (NSSAI) list and is interested in the slicing information, the UE 110 may then receive the PDSCH.

In a seventh example, the filter information may include an indication 770 of a partial UE ID (e.g., N least significant bits (LSB). When the UE 110 receives this indication 770, the UE 110 may determine whether the N LSB of its UE ID is the same as the partial UE ID. If it is, the UE 110 may then receive the PDSCH.

In an eighth example, the filter information may include an indication 780 of a configured wakeup signal group identification (WUS Group ID). If the UE 110 is configured with a matching WUS Group ID, the UE 110 may then receive the PDSCH.

In an ninth example, the filter information may include an indication 790 of a rule based WUS Group ID. If the UE 110 satisfies the rule, the UE 110 may then receive the PDSCH.

It should be understood that the above examples are not a complete list of the filter information that may be included in the DCI. Other information may also be included that may allow the UE 110 to determine whether it is interested in the PDSCH. It should also be understood that the above provided examples of negative and positive interest in PDSCH reception. For example, the indication 750 corresponding to the CN initiated paging may be considered a negative indicator to UEs in the RRC Inactive state (e.g., these UEs may ignore the PDSCH) or a positive indicator to UEs in the RRC Idle state (e.g., these UEs should monitor the PDSCH because the page may be for a UE in this state). Furthermore, the filter information in any particular DCI may include one or more of the filter information.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a component of a network:
transmitting configuration information to a user equipment (UE) operating in the network, wherein the configuration information comprises a value K0 based on a scheduling offset between physical downlink control channel (PDCCH) and physical downlink shared channel (PDSCH) and wherein the value K0 is zero or more slots;
configuring a paging downlink control information (DCI) to be transmitted to the UE on the PDCCH, wherein the paging DCI includes scheduling information for the PDSCH; and
transmitting the paging DCI to the UE on the PDCCH.

2. The method of claim 1, further comprising:
configuring the PDSCH to comprise paging information corresponding to the paging DCI; and
transmitting the PDSCH in a scheduled slot that is offset K0 slots from a scheduled slot n which the paging DCI was transmitted.

3. The method of claim 1, wherein the paging DCI further includes filter information.

4. The method of claim 3, wherein the filter information comprises one of an indication of whether the paging DCI is related to non-3GPP access, whether the paging DCI is related to voice information, whether the paging DCI is related to non-voice information, whether the paging DCI is related to a radio access network (RAN) initiated page, whether the paging DCI is related to a core network (CN) initiated page, whether the paging DCI is related to slicing information, whether the paging DCI comprises a partial UE identification (ID), whether the paging DCI comprises a configured wakeup group ID (WUS ID) or whether the paging DCI comprises a rule based WUS ID.

5. The method of claim 1, wherein the configuration information further comprises a value N based on a minimum gap between reception of the paging DCI by the UE and fully processing the paging DCI by the UE, wherein the value N is determined based on a standard for operating the network.

6. The method of claim 1, wherein the paging DCI comprises a short message.

7. The method of claim 1, wherein the component of the network is one of a next generation node B (gNB) or a core network component.

8. A network component of a network, comprising:
a processor configured to:
configure configuration information for a user equipment (UE) operating in the network, wherein the configuration information comprises a K0 based on a scheduling offset between physical downlink control channel (PDCCH) and physical downlink shared channel (PDSCH) and wherein the value K0 is zero or more slots, and configure a paging downlink control information (DCI) to be transmitted to the UE on the PDCCH, wherein the paging DCI includes scheduling information for the PDSCH; and a transceiver configured to transmit configuration infoiiiation and the paging DCI to the UE.

9. The network component of claim 8, wherein the processor is further configured to:
configure the PDSCH to comprise paging information corresponding to the paging DCI; and
schedule the PDSCH to be transmitted in a scheduled slot that is offset K0 slots from a scheduled slot in which the paging DCI was transmitted.

10. The network component of claim 8, wherein the paging DCI further includes filter information.

11. The network component of claim 10, wherein the filter information comprises one of an indication of whether the paging DCI is related to non-3GPP access, whether the paging DCI is related to voice information, whether the paging DCI is related to non-voice information, whether the paging DCI is related to a radio access network (RAN) initiated page, whether the paging DCI is related to a core network (CN) initiated page, whether the paging DCI is related to slicing information, whether the paging DCI comprises a partial UE identification (ID), whether the paging DCI comprises a configured wakeup group ID (WUS ID) or whether the paging DCI comprises a rule based WUS ID.

12. The network component of claim 8, wherein configuration information further comprises a value N based on a minimum gap between reception of the paging DCI by the UE and fully processing the paging DCI by the UE, wherein the value N is determined based on a standard for operating the network.

13. The network component of claim 8, wherein the paging DCI comprises a short message.

14. The network component of claim 8, wherein the network component is one of a next generation node B (gNB) or a core network component.

15. An integrated circuit, comprising:
circuitry configured to transmit configuration information to a user equipment (UE) operating in the network, wherein the configuration information comprises a value K0 based on a scheduling offset between physical downlink control channel (PDCCH) and physical downlink shared channel (PDSCH) and wherein the value K0 is zero or more slots;
circuitry configured to configure a paging downlink control information (DCI) to be transmitted to the UE on the PDCCH, wherein the paging DCI includes scheduling information for the PDSCH; and
circuitry configured to transmit the paging DCI to the UE on the PDCCH.

16. The integrated circuit of claim 15, further comprising:
circuitry configured to configure the PDSCH to comprise paging information corresponding to the paging DCI; and
circuitry configured to schedule the PDSCH to be transmitted in a scheduled slot that is offset K0 slots from a scheduled slot in which the paging DCI was transmitted.

17. The integrated circuit of claim 15, wherein the paging DCI further includes filter information.

18. The integrated circuit of claim 17, wherein the filter information comprises one of an indication of whether the paging DCI is related to non-3GPP access, whether the paging DCI is related to voice information, whether the paging DCI is related to non-voice information, whether the paging DCI is related to a radio access network (RAN) initiated page, whether the paging DCI is related to a core network (CN) initiated page, whether the paging DCI is related to slicing information, whether the paging DCI comprises a partial UE identification (ID), whether the paging DCI comprises a configured wakeup group ID (WUS ID) or whether the paging DCI comprises a rule based WUS ID.

19. The integrated circuit of claim 15, wherein configuration information further comprises a value N based on a minimum gap between reception of the paging DCI by the UE and fully processing the paging DCI by the UE, wherein the value N is determined based on a standard for operating the network.

20. The integrated circuit of claim 15, wherein the paging DCI comprises a short message.

* * * * *